(12) United States Patent
Jeong (10) Patent No.: US 7,623,891 B2
(45) Date of Patent: Nov. 24, 2009

(54) CAMERA-EQUIPPED MOBILE TERMINAL AND METHOD FOR CONTROLLING PICTURE-TAKING FUNCTION OF THE SAME

(75) Inventor: Won-Bae Jeong, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 758 days.

(21) Appl. No.: 10/945,301

(22) Filed: Sep. 20, 2004

(65) Prior Publication Data

US 2005/0192038 A1    Sep. 1, 2005

(30) Foreign Application Priority Data

Feb. 26, 2004   (KR) .................... 10-2004-0013019

(51) Int. Cl.
*H04M 1/00* (2006.01)
(52) U.S. Cl. .................................... 455/556.1; 396/429
(58) Field of Classification Search .............. 455/456.4, 455/556.1, 550.1; 379/433.1; 348/211.1, 348/211.2, 552; 396/429, 434
See application file for complete search history.

(56) References Cited

U.S. PATENT DOCUMENTS

| 6,363,260 | B1 * | 3/2002 | Achour et al. | 455/553.1 |
| 7,039,425 | B1 * | 5/2006 | Mazawa et al. | 455/456.4 |
| 2005/0064856 | A1 * | 3/2005 | Atkin et al. | 455/418 |
| 2005/0075117 | A1 * | 4/2005 | Jang | 455/456.4 |

FOREIGN PATENT DOCUMENTS

JP        2002135838 A  *  5/2002

\* cited by examiner

*Primary Examiner*—Raymond S Dean
(74) *Attorney, Agent, or Firm*—The Farrell Law Firm, LLP (57) ABSTRACT

A camera-equipped mobile terminal and a method for automatically restricting the use of its picture-taking function are provided. The terminal detects a frequency signal of a wireless channel other than wireless channels used for communication, which has high Received Signal Strength Indication (RSSI) and low pilot power/total received power (Ec/Io). If the strength (i.e., RSSI value) of the detected frequency signal is greater than a predetermined threshold, the picture-taking function of the mobile terminal is deactivated.

5 Claims, 5 Drawing Sheets

CAMERA-EQUIPPED MOBILE TERMINAL AND METHOD FOR CONTROLLING PICTURE-TAKING FUNCTION OF THE SAME

PRIORITY

This application claims priority to an application entitled "CAMERA-EQUIPPED MOBILE TERMINAL AND METHOD FOR CONTROLLING PICTURE-TAKING FUNCTION OF THE SAME", filed in the Korean Intellectual Property Office on Feb. 26, 2004 and assigned Serial No. 2004-0013019, the contents of which are incorporated herein by reference.

BACKGROUND OF THE INVENTION

1. Field of the Invention

The present invention relates to a camera-equipped mobile terminal in a mobile communication system, and more particularly to a camera-equipped mobile terminal and a method for controlling a photo-taking function of the same.

2. Description of the Related Art

As mobile phones have become more commonplace, their accompanying annoyances have correspondingly increased. For example, it is well known that ringing cell phones are often annoying to others at meetings, theater performances, and other settings. To reduce this problem, cell phones have been equipped with the ability to turn their ringers off and to vibrate instead. Additionally, methods have been devised to automatically switch cell phones to a vibration mode in selected areas.

Advances in technology have resulted in a continuous introduction of many new mobile phone models, the latest of which are equipped with cameras which enable the user to easily take pictures using them anywhere and at any time. Camera-equipped mobile phones enable the user to more readily capture fleeting moments such as accident scenes and the like. Additionally, they allow picture-taking at any time when desired. Despite these advantages, the camera-equipped mobile phones cause new problems. Indeed, the camera-equipped mobile phones sometimes serve as hidden cameras, raising social concerns. For example, the use of the camera-equipped phones in public places such as saunas and bathrooms invades the privacy of others. In some cases, the camera-equipped phones are used to take pictures of secret government information, materials, facilities or corporate materials, so that state or corporate secrets are compromised. In military security zones and corporate research centers, authorized persons or visitors, as well as military or industrial spies, may enter the areas with camera-equipped mobile phones with or without the intention to use their picture-taking functions. In this case, it is easy for them to intentionally or accidentally use the picture-taking functions, causing great harm.

As described above, the users can use the camera-equipped mobile terminals to take pictures anywhere and at any time. However, there are currently no effective methods to prevent the camera-equipped mobile terminals from taking pictures in private or restricted areas thus causing an invasion of privacy or leakage of state or corporate secrets. Thus, there is a need to provide a technology for selectively controlling the picture-taking function of mobile terminals to prevent such problems.

SUMMARY OF THE INVENTION

Therefore, the present invention has been made in view of the above problem, and it is an object of the present invention to provide a camera-equipped mobile terminal and a method for selectively controlling picture-taking function of the same, so as to ensure privacy and security of persons and of information in areas where leakage of secret information and an invasion of privacy may be caused by careless or intentional use of the picture-taking function of the mobile terminal.

In accordance with the present invention, the above and other objects can be accomplished by the provision of a method for selectively controlling picture-taking function of a mobile terminal, the method including: detecting a frequency signal of a wireless channel other than wireless channels used for communication, said wireless channel having high Received Signal Strength Indication (RSSI) and low pilot power/total received power (Ec/Io); and deactivating the picture-taking function of the mobile terminal if an RSSI value indicating the strength of the detected frequency signal is greater than a predetermined threshold.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Embodiments of the present invention are described in detail with reference to the annexed drawings.

For the sake of clarity, it is assumed in the following description that the mobile terminal is equipped with a camera.

Figure 1:
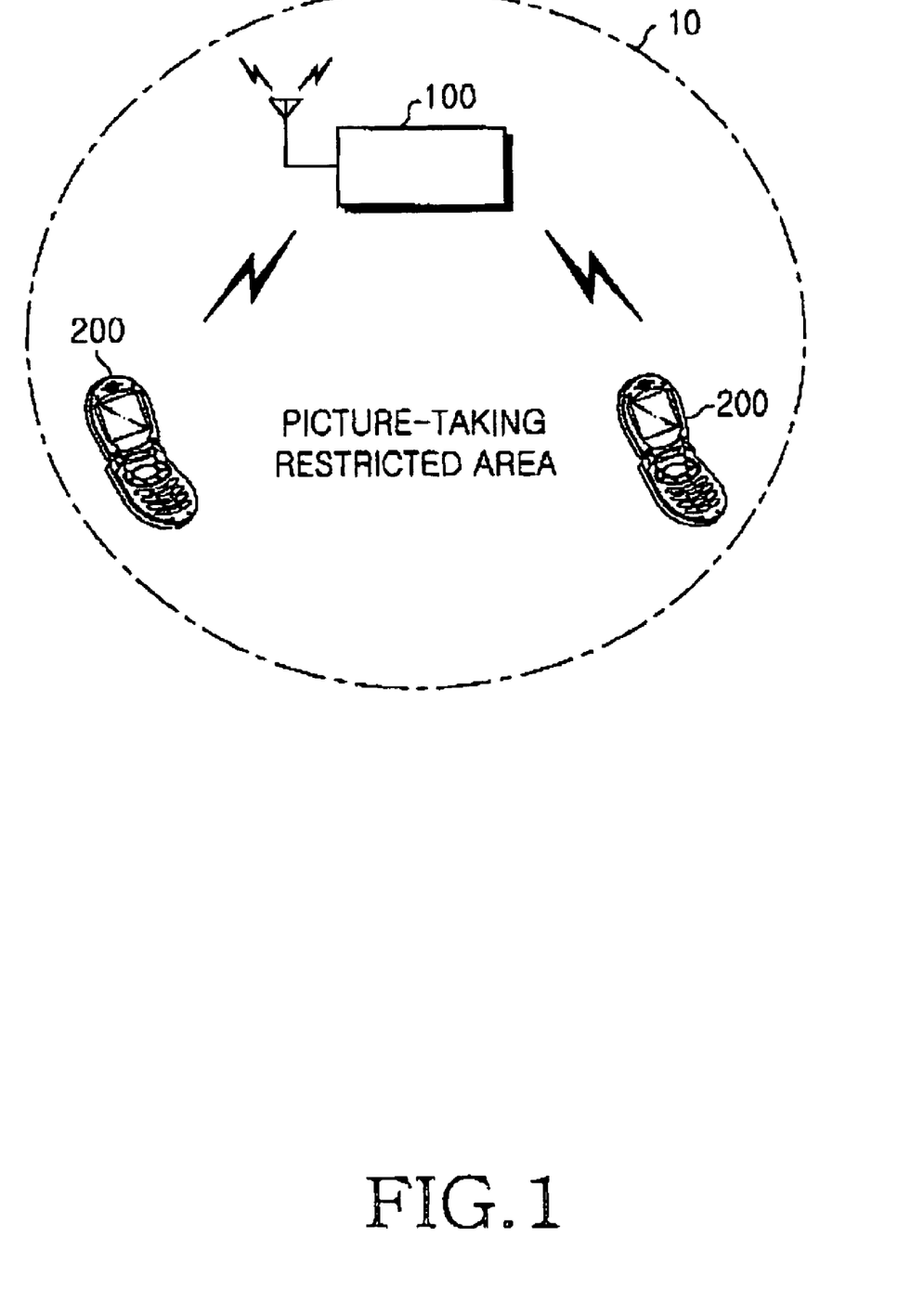
FIG. 1 is a diagram showing the configuration of a system for controlling a picture-taking function according to the present invention.

FIG. 1 is a diagram showing the configuration of a system for controlling a picture-taking function according to the present invention. The picture-taking-prevention frequency generator 100 generates a specific-frequency signal which indicates the picture-taking prohibition and transmits the signal to indicate that the area is a picture-taking-restricted area 10. The frequency generator 100 adjusts the strength of the signal that is propagated, so that all mobile terminals 200 in area 10, where it is desired to prevent the use of the picture-taking ability of mobile terminals, will detect frequency signals having more than a specific signal strength. The mobile terminal 200 in the picture-taking-restricted area receives a specific-frequency signal which indicates the picture-taking prohibition which is transmitted from the frequency generator 100. The mobile terminal 200 deactivates its picture-taking function if the strength of the received specific-frequency signal is greater than a predetermined threshold. The configuration and operation of the frequency generator 100 will now be described in detail with reference to FIG. 2.

Figure 2:
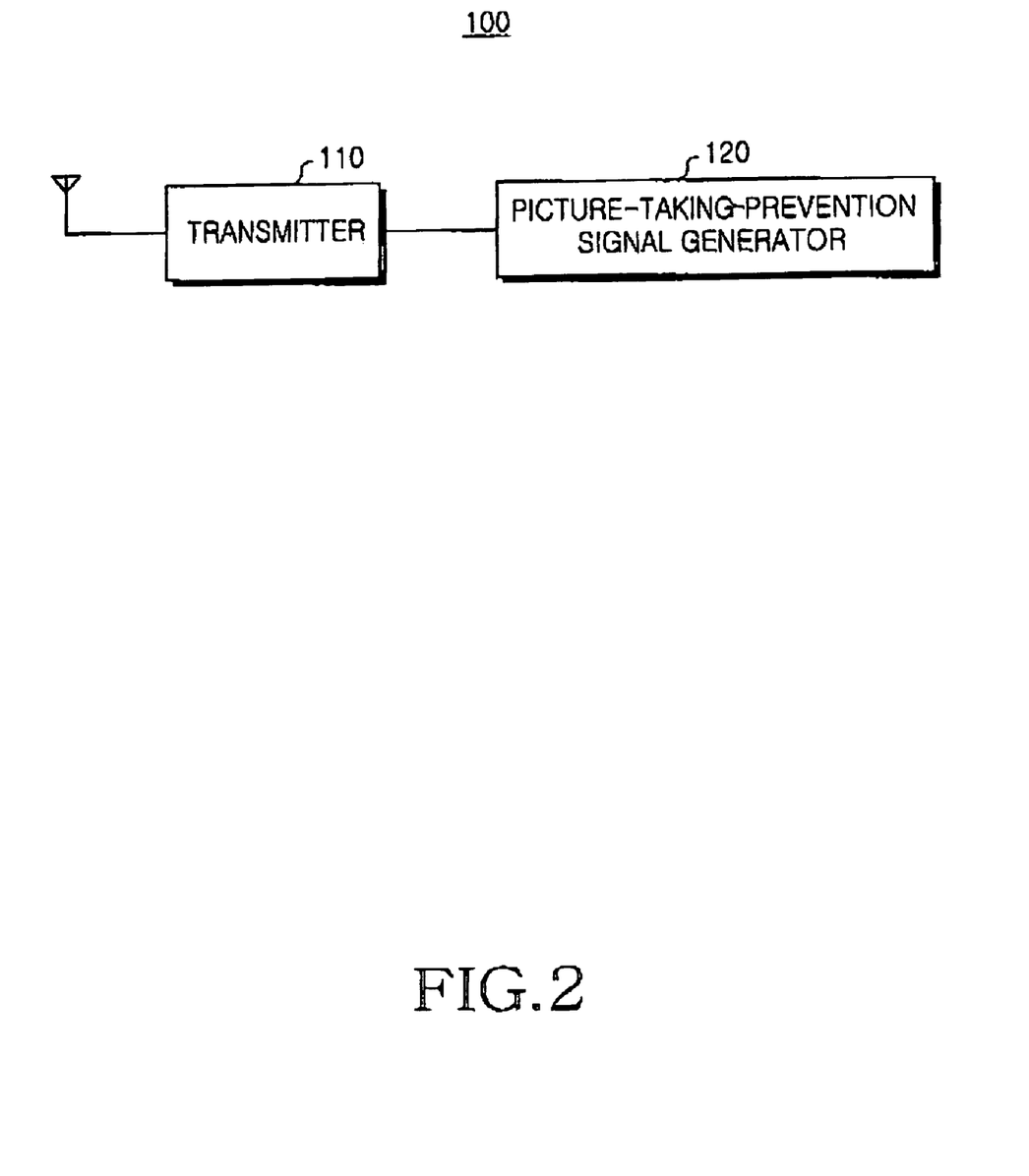
FIG. 2 is a block diagram showing the configuration of a frequency generator and transmitter according to an embodiment of the present invention.

FIG. 2 is a block diagram showing the configuration of a frequency generator and transmitter according to an embodiment of the present invention. The picture-taking-prevention frequency generator 100 includes a transmitter 110 and a picture-taking-prevention signal generator 120 for generating a frequency signal which indicates a picture-taking restriction. The picture-taking-prevention signal generator 120 generates a frequency signal which is detectable by mobile terminals 200 in the specific area 10 (as shown in FIG. 1), and outputs the frequency signal to the transmitter 110. The frequency signal which indicates the picture-taking prevention may be transmitted on one of a plurality of wireless channels available in a mobile communication system. Specifically, a wireless channel not currently used for wireless communication in the picture-taking-restricted area, and which is spaced apart from the currently used wireless channels to the extent that it is sufficiently distinguished from the currently used wireless channels, may be assigned to transmit the frequency signal indicating the picture-taking restriction.

The strength of the frequency signal may be determined based on a desired size of the picture-taking-restriction area as described above. The transmitter 110 propagates the frequency signal provided from the picture-taking-prevention signal generator 120. If the frequency generator 100 generates and propagates a specific-frequency signal in the above manner, the mobile terminals 200 in the specific area can receive the specific-frequency signal.

Figure 3:
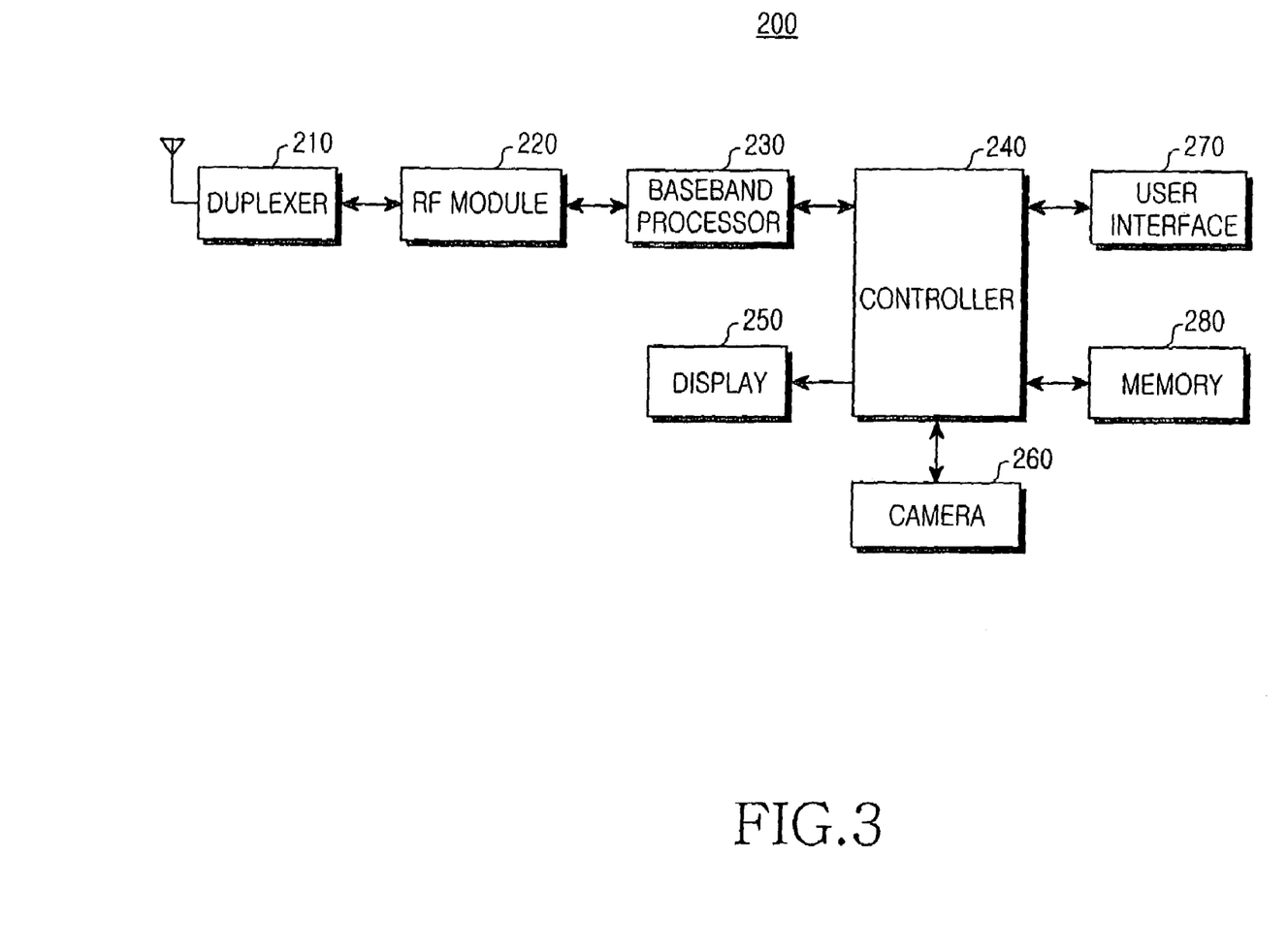
FIG. 3 is a block diagram showing the configuration of a mobile terminal according to an embodiment of the present invention.

FIG. 3 is a block diagram showing the configuration of a mobile terminal according to an embodiment of the present invention. The terminal includes a duplexer 210, an RF module 220, a baseband processor 230, a controller 240, a display unit 250, a camera 260, a user interface 270 and a memory 280. The RF module 220 transmits and receives RF signals to and from a base station through an antenna. During reception, the RF module 220 converts an RF signal received from the duplexer 210 into an (Intermediate Frequency) IF signal, and outputs it to the baseband processor 230, whereas, during transmission, the RF module 220 converts an IF signal received from the baseband processor 230 into an RF signal and transmits it through the duplexer 210. According to the present invention, the RF module 220 detects a specific-frequency signal and provides it to the controller 240 via the baseband processor 230. The duplexer 210 transmits a radio signal received from the RF module 220 through the antenna and provides a signal received through the antenna to the RF module 220. The baseband processor 230 is a Baseband Analog ASIC (BAA) that provides an interface between the controller 240 and the RF module 220. During transmission, the baseband processor 230 converts a digital baseband signal received from the controller 240 into an analog IF signal, and then provides it to the RF module 220. On the other hand, during reception, the baseband processor 230 converts an analog IF signal received from the RF module 220 into a digital baseband signal and then provides it to the controller 240.

The baseband processor 230 measures Received Signal Strength Indication (RSSI) and pilot power/total received power (Ec/Io) and outputs them to the controller 240. The RSSI indicates the strength of signals of all wireless channels, including wireless channels currently not in use for communication. The Ec/Io indicates the strength of a signal of a wireless channel currently used for communication.

Using the Ec/Io, the controller 240 can determine the strength of a wireless channel currently used for communication. If a signal of a wireless channel, which is not in use for communication but has a high RSSI value, is detected, the controller 240 regards the detected signal as a frequency signal indicating a picture-taking restriction. In other words, if a wireless channel signal, which has a low Ec/Io value but a high RSSI value, is detected, the controller 240 recognizes the detected signal as a frequency signal indicating a picture-taking restriction. Since such wireless channel detection is performed at time intervals of a very short period, the controller 240 can rapidly detect whether the terminal has entered the picture-taking-restricted area. The controller 240 then sets an indicator of the picture-taking-restricted area, so that when the picture-taking function is selected by the user, the controller 240 can determine whether to prevent the use of the picture-taking function, with reference to the indicator of the picture-taking-restricted area.

When the user selects the picture-taking function, the controller 240 may optionally determine whether to prevent the use of the picture-taking function by checking whether a received wireless channel signal includes the signal indicating a picture-taking restriction. Specifically, if a specific-frequency signal indicating picture-taking restriction is received and the strength of the received signal is greater than a predetermined threshold, the controller 240 deactivates the picture-taking function of the camera 260. The controller 240 may also display a message or icon indicating the picture-taking-restricted area on the display unit 250. That is, when the mobile terminal is located in the picture-taking-restricted area, the controller 240 deactivates the picture-taking function of the mobile terminal and displays a message indicating the picture-taking-restricted area on the display unit 250.

The controller 240 may also be configured to deactivate the picture-taking function even when a wireless channel used for communication is not currently detected. This is to prevent an ill-intentioned user from using the picture-taking function after removing the RF module 220 or manipulating it to be inactive. The picture-taking function can be controlled as shown in Table 1.

TABLE 1

| wireless channel used for communication detected | picture-taking restricted channel detected | Picture-taking function | telephone call function |
| --- | --- | --- | --- |
| ○ | X | ○ | ○ |
| X | X | ○ | X |
| ○ | ○ | X | ○ |
| X | ○ | X | X |

In Table 1, "O" denotes that a corresponding channel is detected or that a corresponding function is activated and "X" denotes that a corresponding channel is not detected or that a corresponding function is deactivated.

The memory 280 includes a Read Only Memory (ROM) and a Random Access Memory (RAM) for storing various programs or information required to control the operation of the mobile terminal 200. The user interface 270 includes a plurality of number keys and function keys, and outputs key input data corresponding to a key pressed by the user to the controller 200.

Figure 4:
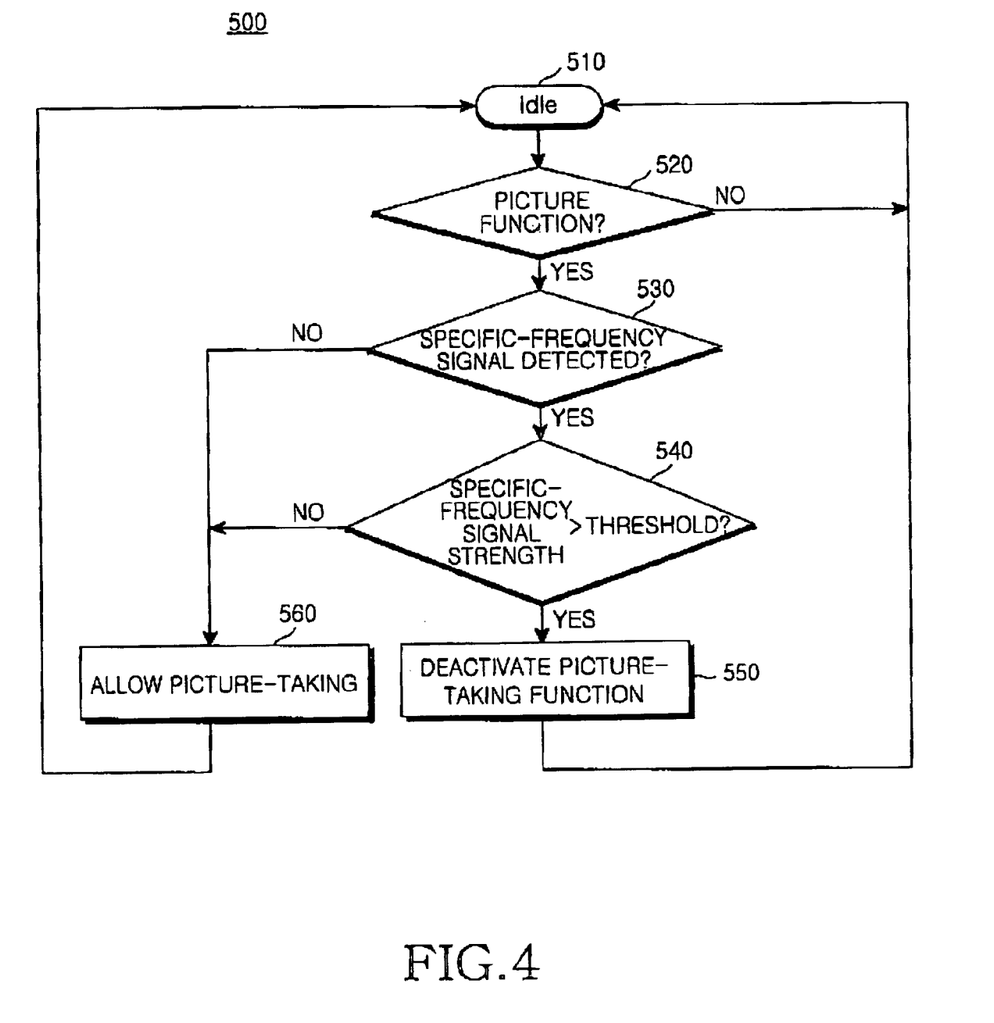
FIG. 4 is a flow chart depicting how the picture-taking function of the mobile terminal is controlled according to an embodiment of the present invention.
Figure 5:
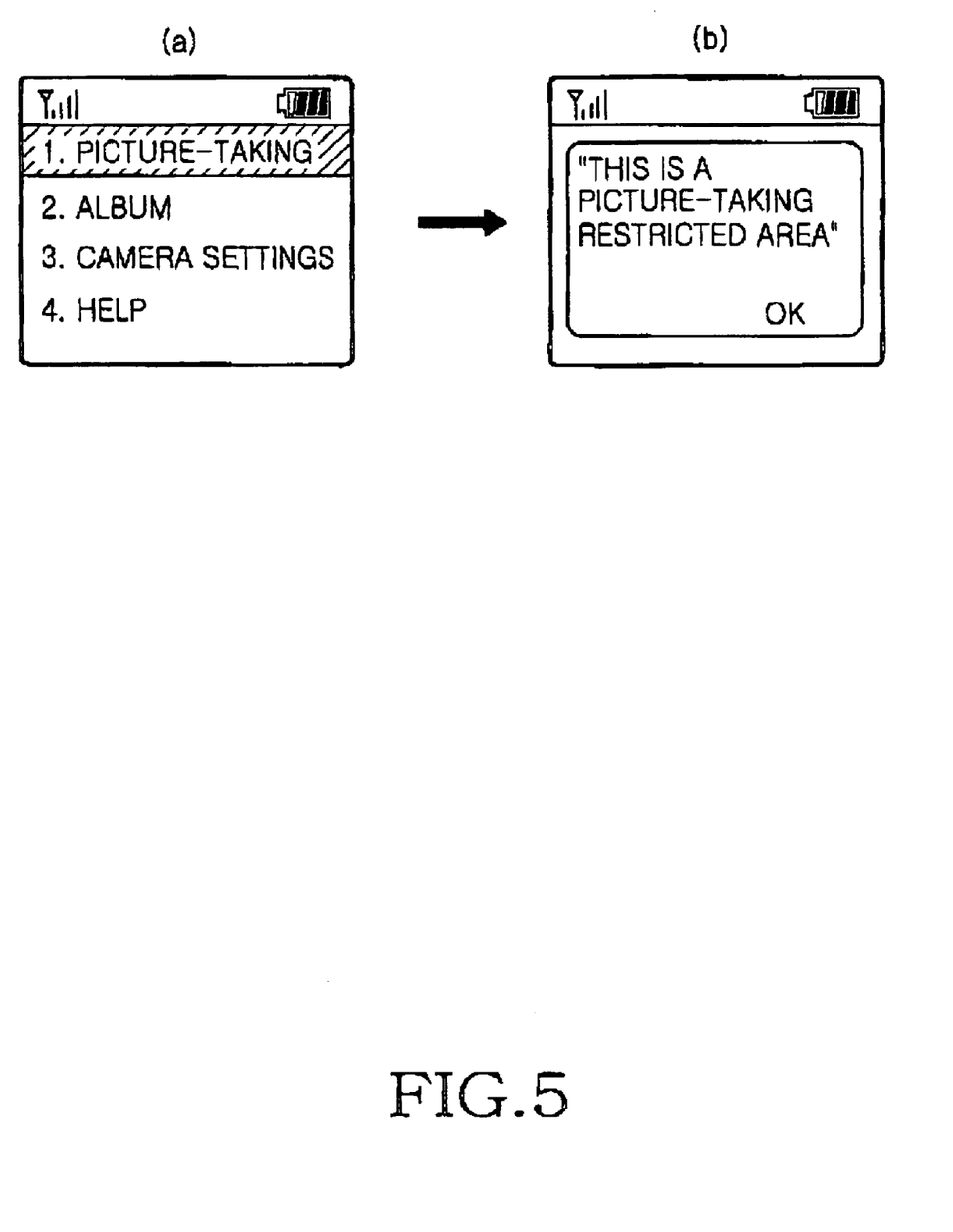
FIGS. 5A and 5B are example screenshots of a camera menu of the mobile terminal according to an embodiment of the present invention.

The procedure for controlling the picture-taking function of the mobile terminal configured as described above will now be described in detail with reference to FIGS. 4, 5A and 5B. FIG. 4 is a flow chart showing how the picture-taking function of the mobile terminal is controlled according to an embodiment of the present invention.

The controller 240 in the mobile terminal first moves from step 510 (standby state) to step 520 to in which it determines whether the user has selected the picture-taking function via the user interface 270 of the mobile terminal. For example, the user can use the picture-taking function by selecting a picture-taking menu item from camera menu items displayed on the display unit 250 as shown in FIG. 5A.

If the user has not selected the picture-taking function, the controller 240 remains in the standby state of step 510. If the user has selected the picture-taking function, the controller 240 moves to step 530 to determine whether a specific-frequency signal indicating a picture-taking restriction is received through the RF module 220. The specific-frequency signal may be a wireless channel signal that has a low Ec/Io value but a high RSSI value, as described above.

If the specific-frequency signal is not received through the RF module 220, the controller 240 moves to step 560 to allow picture-taking through the camera 260.

If the specific-frequency signal indicating a picture-taking restriction is received through the RF module 220, the controller 240 moves to step 540 to determine whether the strength of the specific-frequency signal is greater than a predetermined threshold. As described above, the picture-taking prevention frequency generator generates a frequency signal, the power of which is adjusted so that mobile terminals in the picture-taking-restricted area receive a frequency signal having power greater than a predetermined level. If the mobile terminal restricts its picture-taking function simply by receiving the specific frequency signal, it will be difficult for the picture-taking-prevention frequency generator to define a desired picture-taking-restricted area. Accordingly, the controller 240 in the mobile terminal needs to determine whether the received specific frequency signal has more than the specific signal strength as frequency signals received in the picture-taking prohibited area must have.

If it is determined that the strength of the received specific frequency signal is greater than the predetermined threshold, the controller 240 moves to step 550 to deactivate the picture-taking function so that the user cannot take a picture. If the strength of the received specific frequency signal is less than or equal to the predetermined threshold, the controller 240 moves to step 560 to allow picture-taking through the camera 260.

The controller 240 optionally outputs a message indicating the picture-taking-restricted area on the display unit 250. For example, a message indicating the picture-taking-restriction area as shown in FIG. 5B displayed on the display unit 250.

As described above, when receiving a preset-frequency signal indicating a picture-taking-restriction, a mobile terminal according to an embodiment of the present invention determines whether the strength of the received signal is greater than a predetermined threshold, and deactivates the picture-taking function of the terminal if the received signal strength is greater than the predetermined threshold.

In another embodiment of the present invention, wireless channel detection is performed at intervals of a very short period, so that the terminal detects a frequency signal indicating picture-taking restriction during the periodic wireless channel detection and sets an indicator which indicates that it is in a picture-taking-restricted area. In this embodiment, when the picture-taking function is selected by the user, it can be determined whether the picture-taking function is to be restricted, with reference to the indicator of the picture-taking restricted area.

As apparent from the above description, the present invention provides a camera-equipped mobile terminal and a method for controlling its picture-taking function, which have the following features and advantages. The use of the picture-taking function of the mobile terminal is automatically restricted, thereby preventing a user from taking pictures which in areas which can compromise corporate or state security and/or secrets or lead to an invasion of privacy. The activation and deactivation of the picture-taking function of the mobile terminal is automatically controlled in the above manner, so that the users do not need to be aware of whether they are located in the picture-taking-restricted area, and so that those who desire to prevent the use of mobile terminal cameras in specific areas may do so.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling a picture-taking function of a mobile terminal in a picture-taking restricted area by using a signal generator, the method comprising the steps of:
   generating, by the signal generator, a frequency signal on a specific wireless channel being currently unused for communication, and having high Received Signal Strength Indication (RSSI) and low pilot power/total received power (Ec/Io), the frequency signal being at a signal strength at least above a specific signal strength detectable in the restricted area;
   detecting, by the mobile terminal, the frequency signal;
   determining whether the detected frequency signal has a detected strength greater than a predetermined threshold; and
   deactivating the picture-taking function when a user of the mobile terminal selects the picture-taking function and the detected strength is greater than the predetermined threshold.

2. A method for controlling a picture-taking function of a mobile terminal, the method comprising the steps of:
   receiving a signal at a specific frequency of a wireless channel, the wireless channel being currently unused for communication and having high Received Signal Strength Indication (RSSI) and low pilot power/total received power (Ec/Io), the frequency signal being at a signal strength at least above a specific signal strength detectable in the restricted area;
   determining whether the received signal has a received strength greater than a predetermined threshold; and
   deactivating the picture-taking function when a user of the mobile terminal selects the picture-taking function and the received strength is greater than the predetermined threshold.

3. The method according to claim 1, further comprising the step of displaying a message indicating the picture-taking restricted area when the picture-taking function is deactivated.

4. The method according to claim 2, further comprising the step of displaying a message indicating the picture-taking restricted area when the picture-taking function is deactivated.

5. A camera-equipped mobile terminal having a picture-taking function, the terminal comprising:
   an RF module for receiving and converting a signal at a specific frequency of a wireless channel, the wireless channel being currently unused for communication and having high Received Signal Strength Indication (RSSI) and low pilot power/total received power (Ec/Io); and
a controller for determining whether a strength of the signal is greater than a predetermined threshold, and deactivating the picture-taking function of the mobile terminal when a user of the mobile terminal selects the picture-taking function and the strength is greater than the predetermined threshold.

* * * * *

UNITED STATES PATENT AND TRADEMARK OFFICE
CERTIFICATE OF CORRECTION

PATENT NO.        : 7,623,891 B2                                         Page 1 of 1
APPLICATION NO.   : 10/945301
DATED             : November 24, 2009
INVENTOR(S)       : Won-Bae Jeong It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1069 days.

Signed and Sealed this

Twenty-sixth Day of October, 2010

David J. Kappos
*Director of the United States Patent and Trademark Office*